(12) United States Patent
Henkensmeier et al.

(10) Patent No.: US 9,522,427 B2
(45) Date of Patent: Dec. 20, 2016

(54) PERFLUORINATED SULFONIC ACID POLYMER MEMBRANE HAVING POROUS SURFACE LAYER AND METHOD FOR PREPARING THE SAME

(71) Applicant: KOREA INSTITUTE OF SCIENCE AND TECHNOLOGY, Seoul (KR)

(72) Inventors: Dirk Henkensmeier, Seoul (KR); Quoc Khanh Dang, Seoul (KR); Chang Won Yoon, Seoul (KR); Eun Ae Cho, Seoul (KR); Suk Woo Nam, Seoul (KR); Tae Hoon Lim, Seoul (KR); Hyoung-Juhn Kim, Gyeonggi-do (KR); Jong Hyun Jang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 13/796,083

(22) Filed: Mar. 12, 2013

(65) Prior Publication Data

US 2013/0323496 A1 Dec. 5, 2013

(30) Foreign Application Priority Data

Jun. 1, 2012 (KR) ........................ 10-2012-0059231

(51) Int. Cl.
| | |
|---|---|
| *H01M 8/1023* | (2016.01) |
| *H01M 8/1081* | (2016.01) |
| *H01M 8/1067* | (2016.01) |
| *H01M 8/1039* | (2016.01) |
| *H01M 8/1053* | (2016.01) |

(Continued)

(52) U.S. Cl.
CPC .............. *B23B 3/26* (2013.01); *B29C 39/003* (2013.01); *H01M 8/1004* (2013.01); *H01M 8/1039* (2013.01); *H01M 8/1053* (2013.01); *H01M 8/1081* (2013.01); *B29K 2105/0073* (2013.01); *B29L 2031/3468* (2013.01); *B29L 2031/755* (2013.01); *Y02E 60/523* (2013.01);

(Continued)

(58) Field of Classification Search
CPC ........ B32B 3/26; B32B 39/003; H01M 8/1004
USPC ................................ 428/304.4, 316.6, 319.3
See application file for complete search history.

(56) References Cited

U.S. PATENT DOCUMENTS

| | | | |
|---|---|---|---|
| 6,524,736 B1 * | 2/2003 | Sompalli et al. | ............. 429/535 |
| 2012/0115049 A1 | 5/2012 | Rinzler et al. | |

FOREIGN PATENT DOCUMENTS

| | | |
|---|---|---|
| EP | 1 152 830 B1 | 11/2001 |
| JP | 08-148176 A | 6/1996 |

(Continued)

OTHER PUBLICATIONS

Dong-Jie Guo, et al; "A highly porous nafion membrane templated from polyoxometalates-based supramolecule composite for ion-exchange polymer-metal composite actuator", Journal of Materials Chemistry, vol. 20, Issue 45, pp. 10159-10168, First published on the web Sep. 30, 2010.

(Continued)

Primary Examiner — Victor Chang
(74) Attorney, Agent, or Firm — Ladas & Parry LLP

(57) ABSTRACT

Provided are a perfluorinated sulfonic acid polymer membrane having a porous surface layer, which includes a surface layer and a bottom layer present at the bottom of the surface layer, wherein the surface layer is a porous layer, and the bottom layer is non-porous dense layer, and a method for preparing the same through a solvent evaporation process.

2 Claims, 6 Drawing Sheets

(51) Int. Cl.
  *B23B 3/26*  (2006.01)
  *B29C 39/00*  (2006.01)
  *H01M 8/10*  (2016.01)
  *B29K 105/00*  (2006.01)
  *B29L 31/34*  (2006.01)
  *B29L 31/00*  (2006.01)

(52) U.S. Cl.
  CPC ...... *Y02P 70/56* (2015.11); *Y10T 428/249981* (2015.04); *Y10T 428/249991* (2015.04)

(56) References Cited

FOREIGN PATENT DOCUMENTS

| | | |
|---|---|---|
| KR | 100327096 B1 | 6/2002 |
| KR | 10-0614100 B1 | 8/2006 |
| KR | 1020080039615 A | 5/2008 |
| KR | 100860552 B1 | 9/2008 |
| WO | 2011/038190 A1 | 3/2011 |

OTHER PUBLICATIONS

Jamie A Hestekin, et al; "Modified porous Nafion®: Membrane characterization and two-phase separations", Journal of Membrane Science, vol. 281, Issues 1-2, pp. 268-273, Sep. 15, 2006.

N. Nambi Krishnan, et al; "Sulfonated poly(ether sulfone)-based silica nanocomposite membranes for high temperature polymer electrolyte fuel cell applications", International Journal of Hydrogen Energy, vol. 36, pp. 7152-7161, Available online Apr. 8, 2011.

Jongwon Lee, et al; The Electrochemical Properties of the Porous Nafion Membrane for Proton Exchange Membrane Fuel Cells (PEMFCs), Bulletin of the Korean Chemical Society, vol. 33, Issue 5, pp. 1788-1790, May 2012.

Sang-Yeop Lee, et al; "Development of a 600 W Proton Exchange Membrane Fuel Cell Power System for the Hazardous Mission Robot", Journal of Fuel Cell Science and Technology, Online Mar. 11, 2010, vol. 7, 7 pages.

Oscar W. Reif; "Microfiltration Membranes: Characteristics and Manufacturing", Advances in Biochemical Engineering, vol. 98, pp. 73-103, Feb. 14, 2006.

S.-J. Shin, et al; "Effect of the catalytic ink preparation method on the performance of polymer electrolyte membrane fuel cells", Journal of Power Sources, vol. 106, pp. 146-152, Apr. 1, 2002.

Min-Kyu Song, et al; "Incorporation of Zirconium Hydrogen Phosphate into Porous Ionomer Membranes", Electrochemical and Solid-State Letters, vol. 7, Issue 6, pp. A127-A130, Available electronically Apr. 5, 2004.

J.F. Whitacre, et al; "Enhanced catalyst utilization in PEM fuel cells via ultrafast laser modification of the polymer exchange membrane surface", Electrochemistry Communications, vol. 11, pp. 655-659, Available online Jan. 13, 2009.

\* cited by examiner

PERFLUORINATED SULFONIC ACID POLYMER MEMBRANE HAVING POROUS SURFACE LAYER AND METHOD FOR PREPARING THE SAME

CROSS-REFERENCE TO RELATED APPLICATION

This application claims priority to Korean Patent Application No. 10-2012-0059231, filed on Jun. 1, 2012, and all the benefits accruing therefrom under 35 U.S.C. §119, the contents of which in its entirety are herein incorporated by reference.

BACKGROUND

1. Field

The present disclosure relates to a perfluorinated sulfonic acid polymer membrane having a porous surface layer and a method for preparing the same. More particularly, the present disclosure relates to a perfluorinated sulfonic acid polymer membrane for use in various industrial fields, including fuel cells, gas separators, electrolytic cells, humidifiers, sensors, or the like, and a method for preparing the same.

2. Description of the Related Art

Fuel cells are power generation systems generating electric energy through an electrochemical reaction between hydrogen as fuel and oxygen as oxidant. Such fuel cells may be classified into various types depending on operating temperature, etc. For example, fuel cells are generally classified into polymer electrolyte membrane fuel cells (PEMFC), direct methanol fuel cells (DMFC), or the like.

Electrolyte membranes are used in fuel cells. Electrolyte membranes may be formed of polymeric materials having proton conductivity, and serve not only as a path through which hydrogen ions generated at an anode by oxidation move towards a cathode, but also as an insulator by which an anode and a cathode are separated electrically from each other.

Typical examples of commercially available electrolyte membranes include perfluorinated sulfonic acid polymer membranes, usually known as Nafion membranes. The electrolyte membranes may be used in humidified systems, etc.

SUMMARY

The present disclosure is directed to providing a perfluorinated sulfonic acid polymer membrane having a porous surface layer that may reduce the possibility of delamination between an electrolyte membrane and a catalyst layer, occurring during a humidification cycle of a fuel cell, enhance water transport at an interface between gas and an electrolyte membrane (i.e., gas/membrane interface), increase reverse diffusion of water as a reaction product to help humidification, and provide an increased interfacial area.

The present disclosure is also directed to providing a method for preparing the perfluorinated sulfonic acid polymer membrane having a porous surface layer.

In one aspect, there is provided a perfluorinated sulfonic acid polymer membrane having a porous surface layer, which includes a surface layer and a bottom layer present at the bottom of the surface layer, wherein the surface layer is a porous layer, and the bottom layer is a non-porous dense layer.

According to an embodiment, a catalyst layer may be formed on the porous surface layer; or the porous surface layer and the bottom layer.

According to an embodiment, the perfluorinated sulfonic acid polymer membrane having the porous surface layer may have the porous layers formed on both surfaces thereof.

According to an embodiment, an ion conductive polymeric membrane may be formed on the porous surface layer of the perfluorinated sulfonic acid polymer membrane having the porous surface layer.

According to an embodiment, the ion conductive polymeric membrane may be another perfluorinated sulfonic acid polymer membrane (a second perfluorinated sulfonic acid polymer membrane) having an ion exchange capacity different from the ion exchange capacity of perfluorinated sulfonic acid polymer of the perfluorinated sulfonic acid polymer membrane having the porous surface layer; a sulfonated hydrocarbon-based polymeric membrane; or an anion conductive polymeric membrane.

According to an embodiment, two of the above-described perfluorinated sulfonic acid polymer membranes having the porous surface layer may be laminated in such a manner that the dense bottom layers of the membranes face each other.

According to an embodiment, the perfluorinated sulfonic acid polymer membrane having the porous surface layer may be used in fuel cells, sensors, electrolytic cells, gas separators or humidifiers.

In another aspect, there is provided a method for preparing a perfluorinated sulfonic acid polymer membrane having a porous surface layer through a solvent evaporation process, wherein the perfluorinated sulfonic acid polymer membrane has a porous surface layer and a non-porous dense bottom layer present at the bottom of the surface layer, the method including: adding a non-solvent to a perfluorinated sulfonic acid polymer dispersion containing perfluorinated sulfonic acid polymer and solvent to form a casting solution; applying the casting solution onto a substrate; and evaporating the solvent.

According to an embodiment, the solvent may be at least one selected from water and alcohols.

According to an embodiment, the non-solvent may be o-dichlorobenzene, m-dichlorobenzene, p-dichlorobenzene, naphthalene, or α-naphthol.

According to an embodiment, the non-solvent may be o-dichlorobenzene and contained in the perfluorinated sulfonic acid polymer dispersion in an amount of about 140 mg/ml to about 280 mg/ml.

According to an embodiment, a catalyst layer may be formed on the porous layer; or on the porous layer and the bottom layer.

According to an embodiment, the perfluorinated sulfonic acid polymer membrane having the porous surface layer may have the porous layers formed on both surfaces thereof.

According to an embodiment, an ion conductive polymeric membrane may be formed on the porous surface layer of the perfluorinated sulfonic acid polymer membrane having the porous surface layer.

According to an embodiment, the ion conductive polymeric membrane may be another perfluorinated sulfonic acid polymer membrane (a second perfluorinated sulfonic acid polymer membrane) having an ion exchange capacity different from the ion exchange capacity of perfluorinated sulfonic acid polymer of the perfluorinated sulfonic acid polymer membrane having the porous surface layer; a sulfonated hydrocarbon-based polymeric membrane; or an anion conductive polymeric membrane.

According to an embodiment, the method may further include laminating two of the above-described perfluorinated sulfonic acid polymer membranes having the porous surface layer in such a manner that the dense bottom layers of the membranes face each other.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 6 and FIG. 7 are Scanning Electron Microscopy (SEM) images of the perfluorinated sulfonic acid polymer membrane having a porous surface layer according to Example, wherein FIG. 6 shows the perfluorinated sulfonic acid polymer membrane using about 140 mg of o-dichlorobenzene (ODB) and FIG. 7 shows the perfluorinated sulfonic acid polymer membrane using about 220 mg of ODB.

DETAILED DESCRIPTION OF MAIN ELEMENTS

Figure 1:
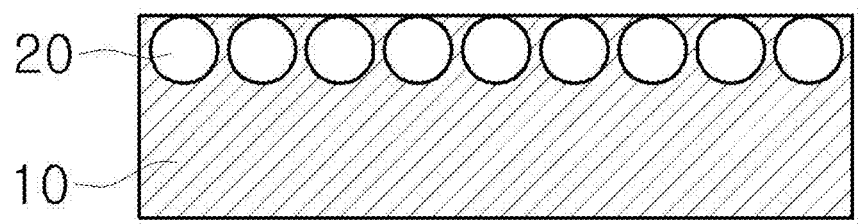
FIG. 1 is a schematic sectional view of a perfluorinated sulfonic acid polymer membrane having a porous surface layer in accordance with an embodiment.

10: non-porous dense bottom layer
20: porous surface layer
30: catalyst layer

DETAILED DESCRIPTION

Exemplary embodiments are described more fully hereinafter. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of features and techniques may be omitted to more clearly disclose exemplary embodiments.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly. The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments will be described in detail with reference to the accompanying drawings.

In this context, perfluorinated sulfonic acid polymer membrane means a membrane made of perfluorinated sulfonic acid polymer.

Perfluorinated sulfonic acid (PFSA) polymer is a well-known ionomer and described by having a Polytetrafluoroethylene (PTFE) backbone and perfluorinated alkyl and/or ether side chains terminated with a sulfonic acid. Nonlimiting examples may include Nafion® (Dupont), Aquivion® (Solvay), Aciplex® (Asahi Kasei) and Flemion® (Asahi Glass). For reference, Nafion is usually used in the art so as to refer to perfluorinated sulfonic acid polymer.

The embodiments of the present disclosure are directed to a perfluorinated sulfonic acid polymer membrane having a porous surface layer, which includes a surface layer and a bottom layer present at the bottom of the surface layer, wherein the surface layer is a porous layer, and the bottom layer is a non-porous dense layer.

FIG. 1 is a schematic sectional view of the perfluorinated sulfonic acid polymer membrane having a porous surface layer in accordance with an embodiment.

As shown in FIG. 1, the perfluorinated sulfonic acid polymer membrane having a porous surface layer according to an embodiment includes a surface layer and a bottom layer present at the bottom of the surface layer, wherein the surface layer is a porous layer 20, and the bottom layer is a non-porous dense layer 10.

Figure 2:
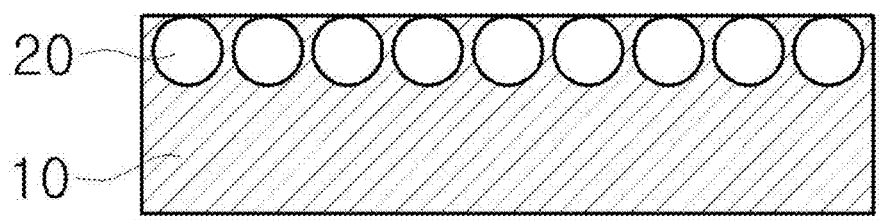
FIG. 2 is a schematic view illustrating formation of a catalyst layer on the perfluorinated sulfonic acid polymer membrane having the porous layer as shown in FIG. 1.
Figure 2:
Figure 2:
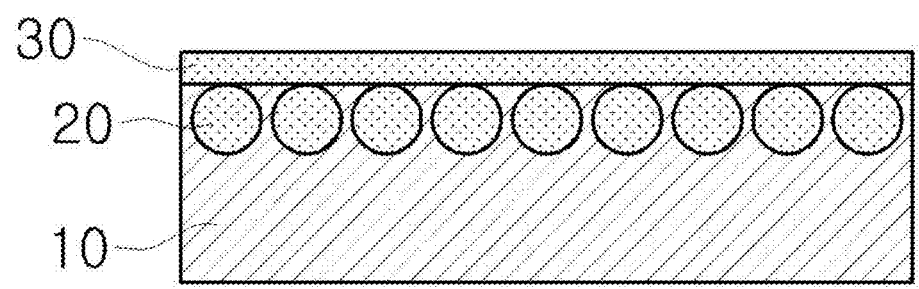

FIG. 2 is a schematic view illustrating formation of a catalyst layer on the perfluorinated sulfonic acid polymer membrane having a porous layer as shown in FIG. 1. Although the catalyst layer may be formed merely on the porous surface layer of the perfluorinated sulfonic acid polymer membrane in FIG. 2, the catalyst layer may be formed on the porous surface layer and the bottom layer of the perfluorinated sulfonic acid polymer membrane. In addition, the porous layer may be formed merely on one surface of the perfluorinated sulfonic acid polymer membrane as in FIG. 1 and FIG. 2. Further, the porous layer may be formed on both surfaces of the perfluorinated sulfonic acid polymer membrane as well.

As shown in FIG. 2, when the perfluorinated sulfonic acid polymer membrane is used as an electrolyte membrane for a fuel cell, the catalyst layer 30 may be formed on the porous surface layer of the perfluorinated sulfonic acid polymer membrane.

When the porous layer is formed on the surface of the perfluorinated sulfonic acid polymer membrane as described above, it is possible, for example, to reduce the possibility of delamination between an electrolyte membrane and a catalyst layer, occurring during a humidification cycle in a fuel cell.

That is, in the case of an electrolyte membrane used in a fuel cell, delamination may occur between an electrolyte membrane and a catalyst formed thereon, for example, during a humidification cycle. Such delamination may result in degradation of the quality of a fuel cell.

Perfluorinated sulfonic acid polymer membrane disclosed herein has a porous surface layer so that a catalyst material may be anchored into the pores present on the surface (so-called, anchoring effect), thereby reducing the possibility of delamination.

In addition, the conductivity of a general perfluorinated sulfonic acid polymer membrane may be lowered under a dry condition or low-humidity condition, and thus the membrane may not function sufficiently.

Perfluorinated sulfonic acid polymer membrane disclosed herein has a porous layer as its surface layer, and thus it increases reverse diffusion of water, which is a reaction product, to help humidification, thereby preventing degradation of the conductivity of the membrane.

Figure 3:
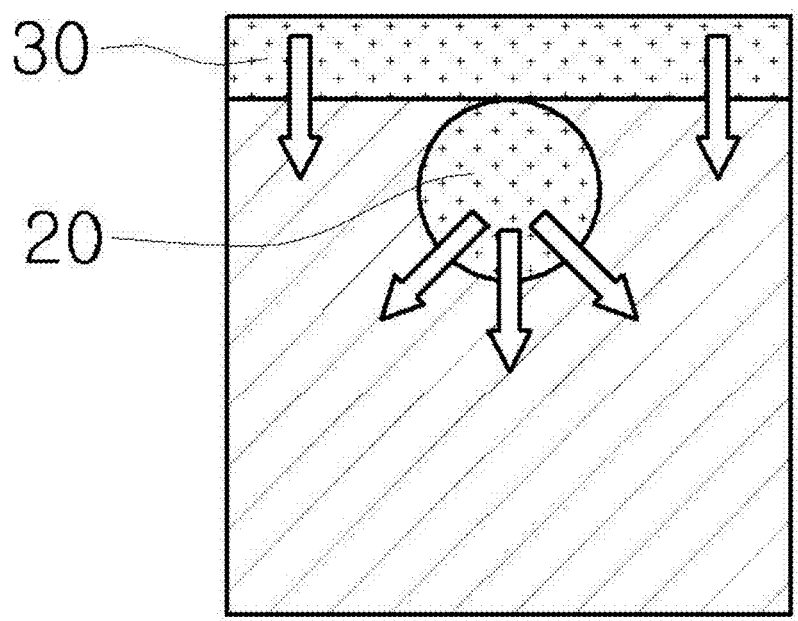
FIG. 3 is a schematic view showing the enlarged pores of the porous surface layer of FIG. 2 to illustrate enhancement of reverse diffusion of water which is a reaction product.

FIG. 3 is a schematic view showing the enlarged pores of the porous surface layer of FIG. 2 to illustrate enhancement of reverse diffusion of water which is a reaction product. In FIG. 3, a catalyst layer 30 is formed on the porous surface layer 20.

In a fuel cell, water is produced at a cathode. The water may be transported partially to a distance by a cathode gas flow, and a part of the water may be returned back to the membrane (i.e., reverse diffusion). Particularly, such a mechanism is important for rehumidification of a membrane under low humidity. Incorporation of a porous layer to the top layer of the membrane according to embodiments may increase the ratio of reverse diffusion (i.e., return to the membrane), while not allowing transport of water to a distance.

Further, the surface porous layer of the perfluorinated sulfonic acid polymer membrane according to embodiments may serve to enhance water transport over a gas/membrane interface.

For example, in a membrane humidifier, flow of humidified gas and that of dry gas are differentiated from each other by the membrane. The membrane absorbs water from wet gas flow and water is diffused through the membrane to humidify dry gas flow. In addition to a gradient of water concentration and membrane thickness (diffusion distance), the surface area of a membrane affects water transport over a gas/membrane interface. Thus, incorporation of a porous layer to the surface of the membrane according to embodiments may enhance water transport over a gas/membrane interface.

In some embodiments, an ion conductive polymeric membrane may be formed on the surface layer of the perfluorinated sulfonic acid polymer membrane having a porous surface layer (first perfluorinated sulfonic acid polymer membrane). For example, an additional ion conductive polymeric membrane may be further formed on the surface layer of the first perfluorinated sulfonic acid polymer membrane by casting a solution of second perfluorinated sulfonic acid polymer (e.g. a solution of second perfluorinated sulfonic acid polymer having an ion exchange capacity different from the ion exchange capacity (IEC) of the first perfluorinated sulfonic acid polymer of the first perfluorinated sulfonic acid polymer membrane), a solution of sulfonated hydrocarbon-based polymer, or a solution of anion conductive polymer onto the surface layer of the first perfluorinated sulfonic acid polymer membrane.

In some embodiments, the perfluorinated sulfonic acid polymer membrane having a porous surface layer may be interposed between one membrane and another membrane (bilayer membrane), for example, between two anion conductive polymeric membranes.

The porous surface layer of the perfluorinated sulfonic acid polymer membrane according to embodiments may increase the interface between membranes, when the membrane is in contact with another membrane or is interposed between two membranes for example two anion conductive membranes as mentioned above, thereby resulting in a decrease in contact resistance and improvement in performance. Further, it is possible to prevent risk of delamination and to improve strong binding by the so-called anchoring effect (entanglement or pore-filling effect) on the microscale.

Meanwhile, according to embodiments, since only the surface layer of the perfluorinated sulfonic acid polymer membrane is a porous layer as described herein, the bottom layer formed at the bottom of the surface becomes a dense layer. The perfluorinated sulfonic acid polymer membrane having such a dense layer may be used more widely in fuel cells, gas separators, sensors, electrolytic cells, humidifiers, or the like, as compared to totally porous perfluorinated sulfonic acid polymer membranes.

For reference, when the perfluorinated sulfonic acid polymer membrane according to embodiments is applied for a gas separator, it may be required that the dense layer is very thin and the surface porous layer supports the thin dense layer. For other applications, a thicker dense layer may be required to prevent gas crossover. Meanwhile, as described above, the perfluorinated sulfonic acid polymer membrane according to embodiments may have an increased surface area and realize an anchoring effect to the adjacent catalyst layer or membrane, as opposed to a general perfluorinated sulfonic acid polymer membrane having no surface porous layer.

The perfluorinated sulfonic acid polymer membrane having a porous surface layer may be obtained by a solvent evaporation process as described hereinafter.

In a solvent evaporation process, a non-solvent having a higher boiling point as compared to a solvent is added to a polymeric solution, and then the polymer forms pores around the non-solvent while the low-boiling point solvent evaporates. The structure and size of the pores formed by such a solvent evaporation process are affected by solvents, non-solvents, concentration and evaporation rate, etc.

In some embodiments, water and/or alcohol is used as a low-boiling point solvent to prepare a perfluorinated sulfonic acid polymer dispersion in advance. Non-limiting examples of the alcohol may include isopropanol, 1-propanol, etc.

For reference, it is known that perfluorinated sulfonic acid polymer forms a solution when a solvent has a dielectric constant ($\in$) larger than about 10 and the dielectric constant of a colloidal dispersion is about 3 to about 10.

In a non-limiting example, a perfluorinated sulfonic acid polymer dispersion may include about 5 wt % to about 40 wt % of perfluorinated sulfonic acid polymer and the balance amount of water and/or alcohol, optionally with other organic solvents (having a boiling point lower than the boiling point of the non-solvent as described hereinafter).

A non-solvent, such as o-dichlorobenzene, m-dichlorobenzene, p-dichlorobenzene, naphthalene or α-naphthol may be added to the dispersion so as to provide a casting solution. The non-solvent may cause little change in dielectric constant of the dispersion so that they may not interrupt dissolution of perfluorinated sulfonic acid polymer.

Next, the casting solution is applied to a substrate. For this purpose, a currently used method, such as doctor blade coating, dip coating, spin coating, etc, may be used.

After applying the perfluorinated sulfonic acid polymer casting solution onto the substrate, the solvent is allowed to evaporate. Such evaporation of the solvent may cause phase separation between the perfluorinated sulfonic acid polymer dispersion and the non-solvent. In addition, as the solvent evaporates, the perfluorinated sulfonic acid polymer dispersion has an increased density, while the droplets of non-solvent float above before solidification of perfluorinated sulfonic acid polymer into a membrane. As a result, it is possible to obtain a perfluorinated sulfonic acid polymer membrane having a porous surface layer and a non-porous dense layer disposed at the bottom thereof.

In an embodiment, the pore size and/or the thickness of the porous surface layer may be controlled, for example, by the concentration of non-solvent.

In an embodiment, the non-solvent is o-dichlorobenzene and may be contained in an amount of about 140 mg to about 280 mg per about 1 ml of the perfluorinated sulfonic acid polymer dispersion.

In an embodiment, a catalyst layer may be further formed on the porous surface layer of the perfluorinated sulfonic acid polymer membrane (see FIG. 2). As shown in FIG. 2, it is possible to form a catalyst layer 30 on the perfluorinated sulfonic acid polymer membrane having a porous surface layer. The catalyst layer may be formed, for example, by spray coating or by solution casting of catalyst ink onto the perfluorinated sulfonic acid polymer membrane having a porous surface layer.

In an embodiment, two of the perfluorinated sulfonic acid polymer membranes obtained as described above may be laminated in such a manner that the dense bottom layers face each other.

Figure 4:
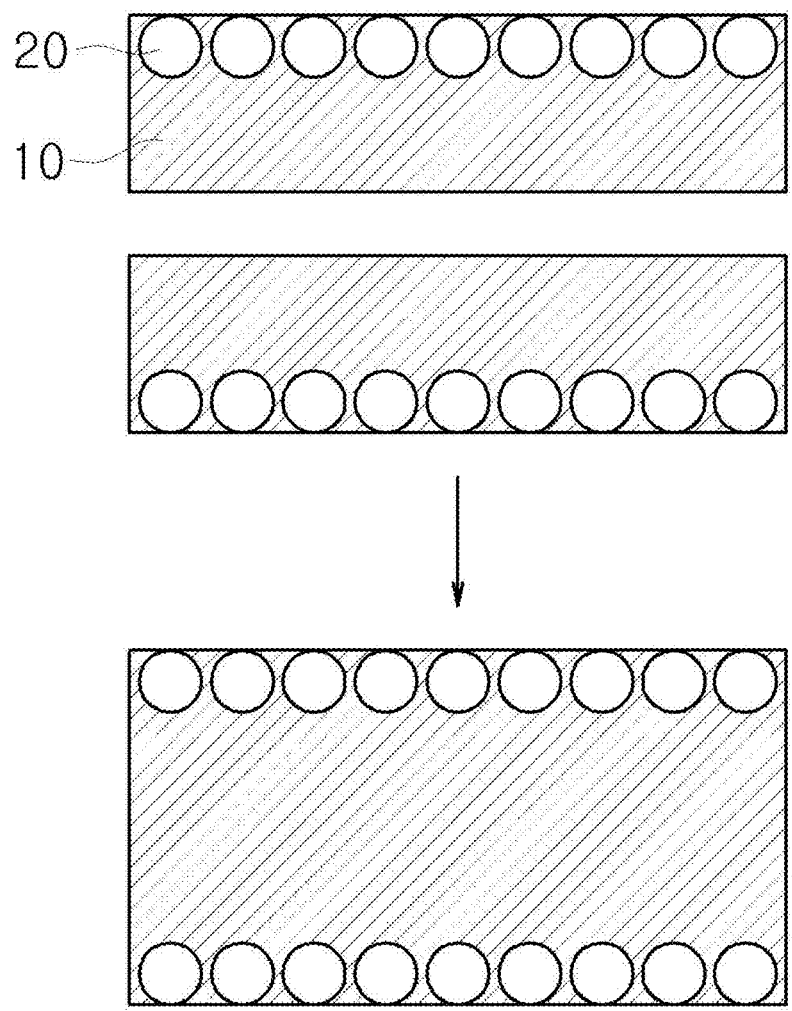
FIG. 4 is a schematic view illustrating a process of laminating two perfluorinated sulfonic acid polymer membranes having a porous surface layer in accordance with an embodiment.

FIG. 4 is a schematic view illustrating a process of laminating two perfluorinated sulfonic acid polymer membranes having a porous surface layer in accordance with an embodiment.

As shown in FIG. 4, a laminate including two perfluorinated sulfonic acid polymer membranes each having a porous surface layer may be formed. In the laminate, two dense bottom layers of the membranes face each other. Thus, both surfaces of the laminate have a porous layer.

The lamination may be carried out by pressing, hot pressing, swelling any one membrane or both membranes with a solvent and then gluing both membranes with each other, wetting an interface with a solvent before lamination, or a combination thereof.

Figure 5:
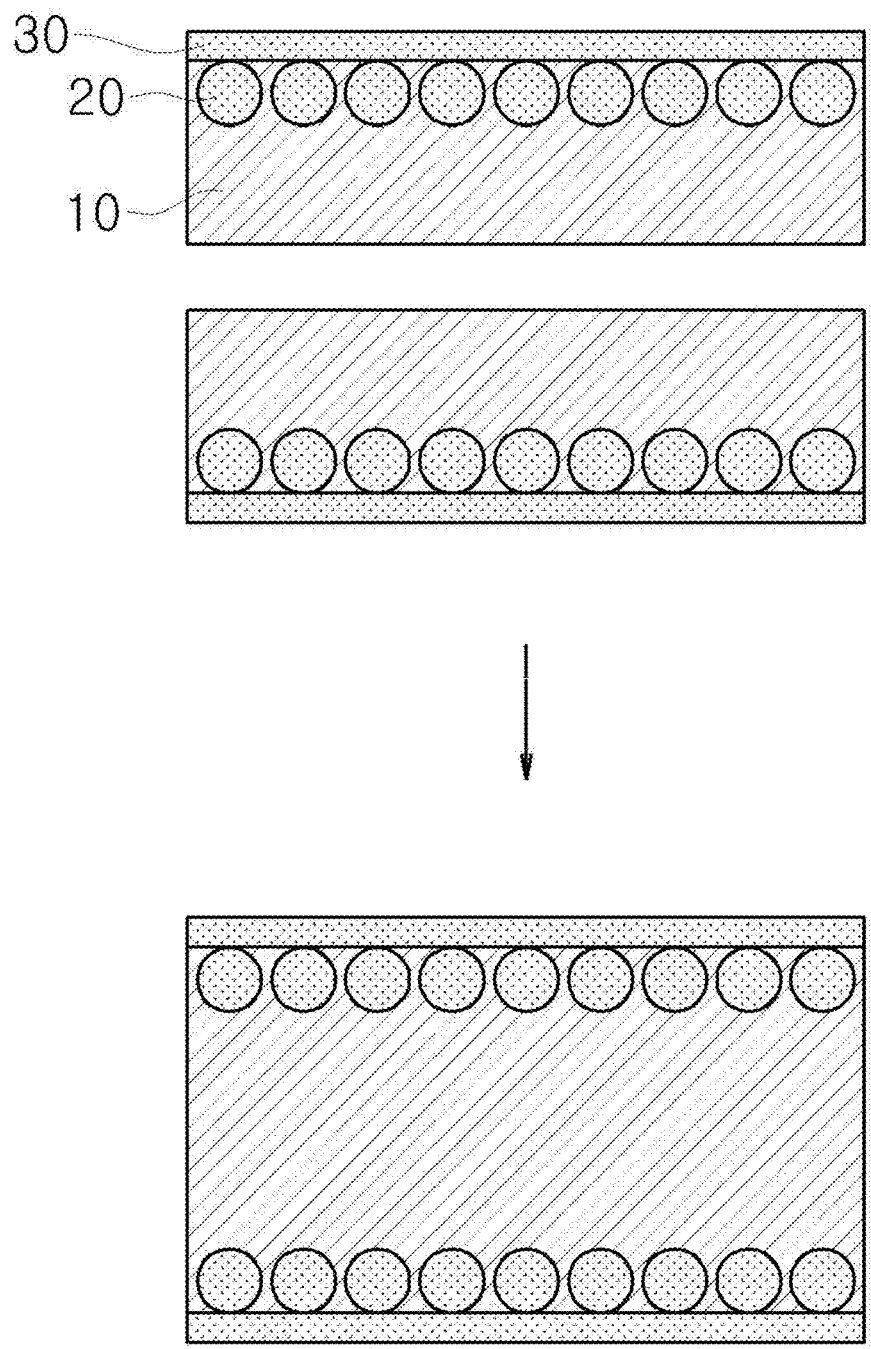
FIG. 5 is a schematic view illustrating a process of laminating two perfluorinated sulfonic acid polymer membranes having a catalyst layer formed on the porous surface layer in accordance with an embodiment.

FIG. 5 is a schematic view illustrating a process of laminating two perfluorinated sulfonic acid polymer membranes having a catalyst layer formed on the porous surface layer in accordance with an embodiment.

In FIG. 5, two perfluorinated sulfonic acid polymer membranes are laminated with each other, wherein each porous layer has a catalyst layer. The lamination may be carried out as described above.

The examples will now be described. The following examples are for illustrative purposes only and not intended to limit the scope of the present disclosure.

Preparation of Perfluorinated Sulfonic Acid Polymer Membrane Having Porous Surface Layer First, a Nafion dispersion SE20092 available from Dupont [about 20 wt % of perfluorinated sulfonic acid polymer, about 80 wt % of a solvent, wherein the solvent contains about 20 wt % of water and about 80 wt % of alcohol (ethanol/1-propanol=about 1:about 1 (weight ratio))] is prepared. O-dichlorobenzene (ODB) is added to the Nafion dispersion. Herein, the amount of ODB per about 1 ml of the Nafion dispersion is shown in the following Table 1. Next, the materials are mixed to form a casting solution, which, in turn, is cast onto a glass substrate to a thickness of about 300 μm by doctor blade coating. After casting, the casting solution is allowed to evaporate overnight under a normal atmospheric condition. To remove any residual ODB, the casting solution is further dried under vacuum at about 60° C.

Since ODB has a dielectric constant of about 9.93, addition of ODB may cause a non-significant change in dielectric constant of the casting solution from about 46 to about 38. Thus, Nafion may be dissolved into the casting solution.

For reference, ODB has a boiling point of about 178° C. to about 180° C., which is higher than the boiling point of ethanol or 1-propanol by about 100° C. Thus, it can be seen that pores are formed by the solvent evaporation process.

The following Table 1 shows the results of the shape and thickness of the prepared membrane (membrane separated from the glass substrate).

TABLE 1

| mg (ODB)/ml (Nafion dispersion) | Preparation process | Membrane appearance | Thickness (μm) |
|---|---|---|---|
| 0 | Casting | Transparent | about 23 |
| about 40 | Casting | Transparent | Not available |
| about 80 | Casting | Transparent | Not available |
| about 140 | Casting | Opaque | about 26 ± 1.7 |
| about 160 | Casting | Opaque | about 29.5 ± 2.4 |
| about 180 | Casting | Opaque | about 29.6 ± 1.6 |
| about 200 | Casting | Opaque | about 31.8 ± 2.8 |
| about 220 | Casting | Opaque | about 37.3 ± 2.7 |
| about 280 | Casting | Opaque, pinholes | Not available |
| about 320 | Casting | Opaque, pinholes | Not available |
| about 360 | Casting | Opaque, pinholes | Not available |
| about 415 | Opaque casting solution, casting not allowed | — | — |

Herein, "Not available" means that the thickness is not measured because the membrane is not homogeneous and has pinholes.

As can be seen from Table 1, when ODB is contained in a certain amount or more, the membrane becomes opaque. Opaque appearance means formation of a porous layer. That is, it can be seen that pore formation occurs at an amount of ODB between about 80 mg and about 140 mg (at least about 140 mg).

Herein, the same doctor blade coating is used to prepare the membranes and the same thickness of about 300 μm is applied. However, the thicknesses of the Nation membranes having a porous surface layer after drying vary depending on ODB amounts as shown in Table 1. That is, a higher ODB concentration in casting solution provides a larger thickness of dried membrane. This suggests that more and larger pores are formed as ODB concentration increases.

Figure 6:
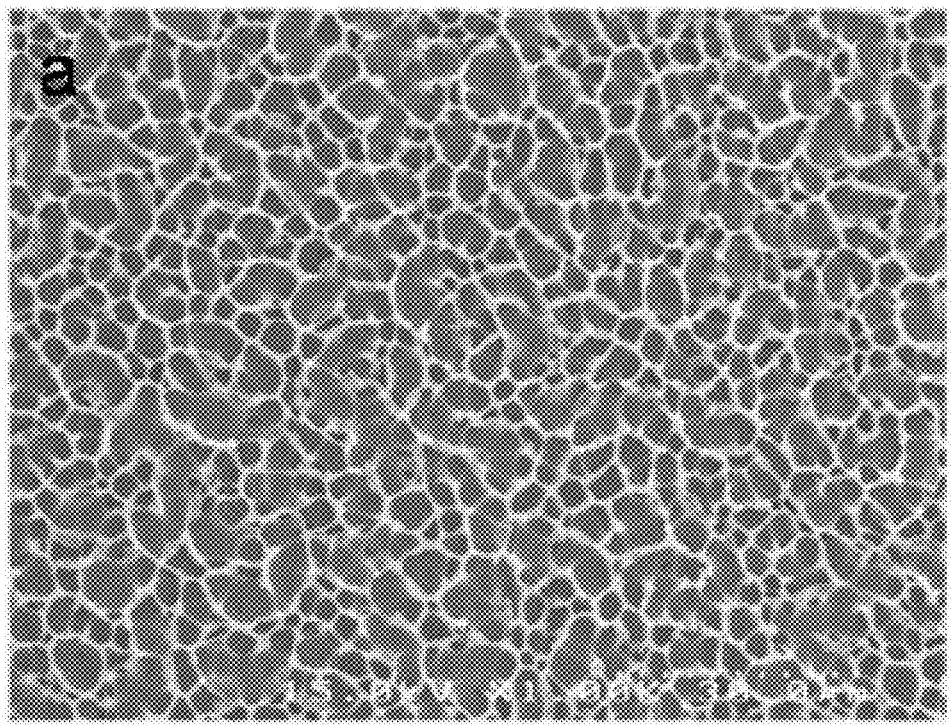
Figure 6:
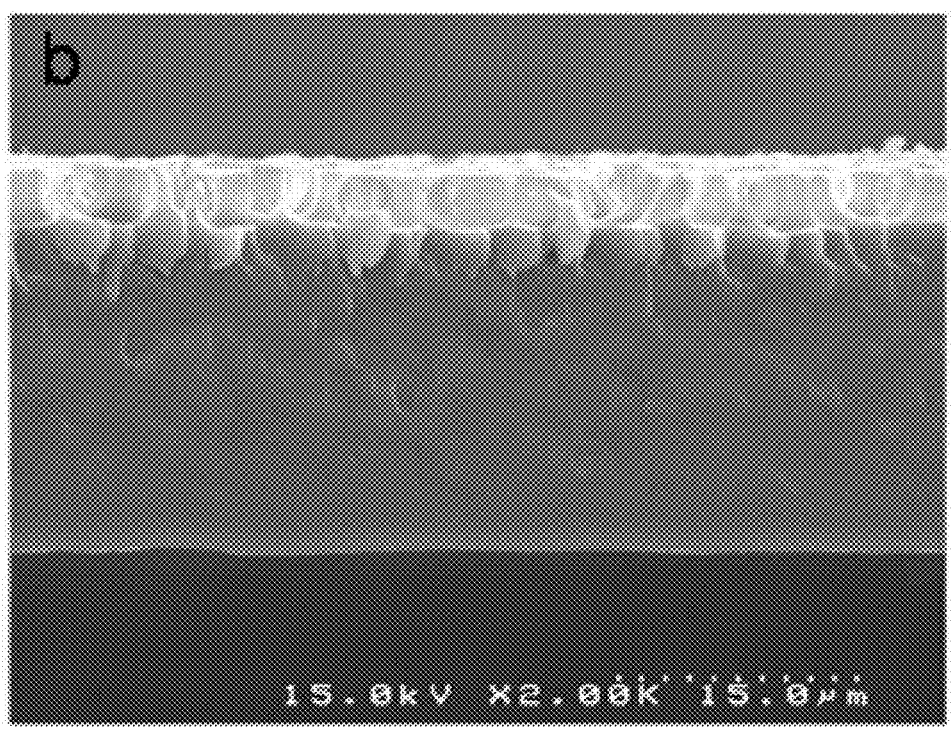
Figure 7:
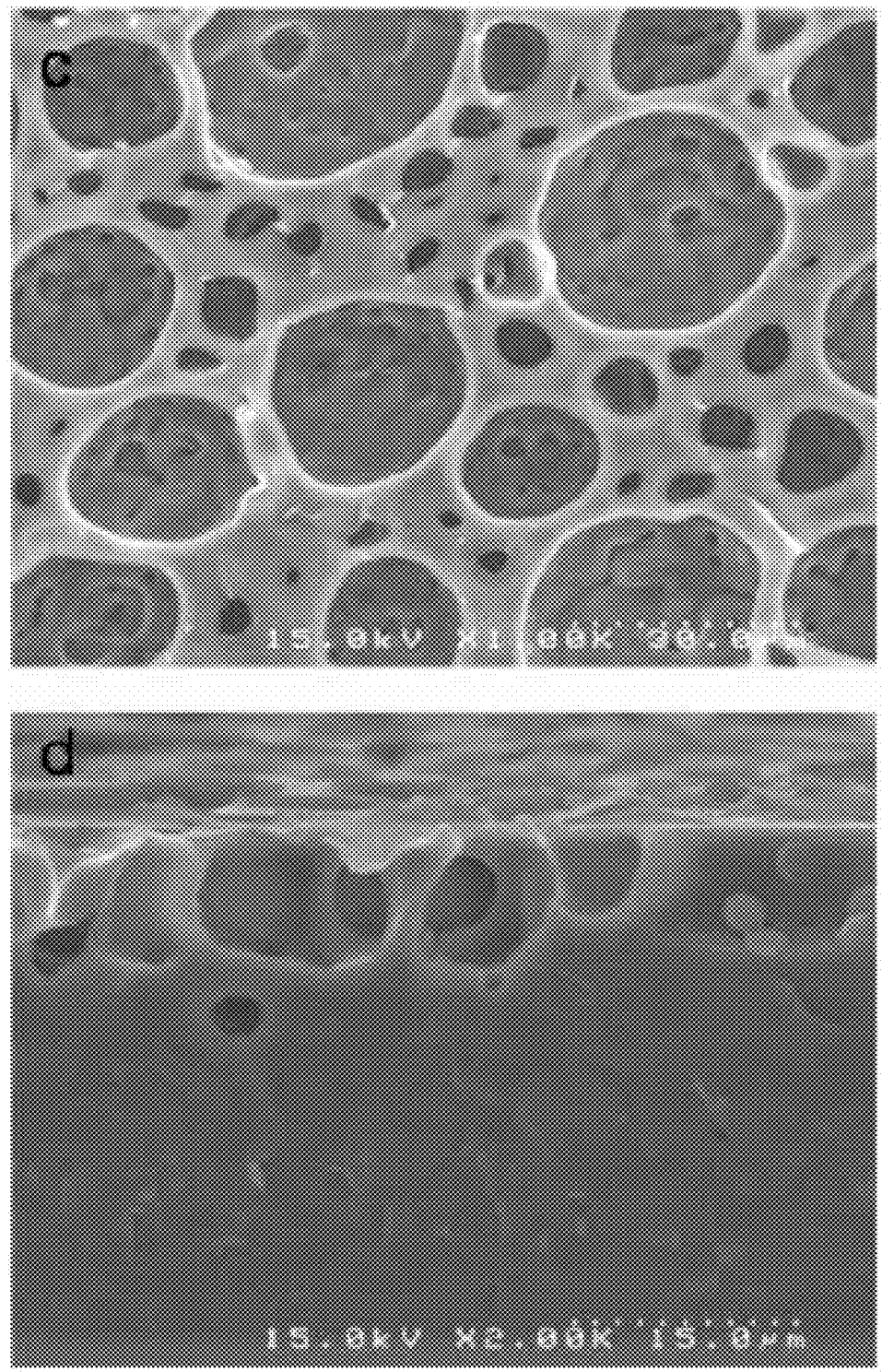

FIG. 6 and FIG. 7 are Scanning Electron Microscopy (SEM) images of the perfluorinated sulfonic acid polymer membrane having a porous surface layer according to Example, wherein FIG. 6 shows the perfluorinated sulfonic acid polymer membrane using about 140 mg of ODB and FIG. 7 shows the perfluorinated sulfonic acid polymer membrane using about 220 mg of ODB.

As can be seen from FIG. 6 and FIG. 7, a porous layer is formed merely on the surface of perfluorinated sulfonic acid polymer and a non-porous dense layer is formed at the bottom of the surface layer. The pores have a shape similar to a breath figure (honeycomb configuration).

As alcohol evaporates from the casting solution and the amount of water increases, ODB solubility in the casting solution decreases. As a result, phase separation of Nafion dispersion and ODB occurs.

Since Nafion has high density, the density of Nafion dispersion increases gradually according to the solvent evaporation. Further, ODB droplets float above the surface before the membrane made from the Nafion dispersion is solidified, thereby forming a porous surface layer. For reference, Nafion has a density of about 1.97 g/ml, while Nafion dispersion and ODB have a density of about 1.01-1.03 g/ml and about 1.31 g/ml, respectively. It is possible to control the pore size and porous layer thickness through the concentration of ODB, which is a non-solvent.

According to embodiments, the perfluorinated sulfonic acid polymer membrane has a porous layer on the surface thereof, and thus may reduce the possibility of delamination between the perfluorinated sulfonic acid polymer membrane and a catalyst layer, occurring during a humidification cycle of a fuel cell, enhance water transport at a gas/membrane interface, increase reverse diffusion of water, which is a reaction product, to help humidification, and provide an increased interfacial area, such as an interfacial area between one membrane and another membrane (in the case of a multilayer membrane), an interfacial area between a catalyst layer and the perfluorinated sulfonic acid polymer membrane, and an interfacial area between a gas phase and the perfluorinated sulfonic acid polymer membrane in the case of a humidifier.

While the exemplary embodiments have been shown and described, it will be understood by those skilled in the art that various changes in form and details may be made thereto without departing from the spirit and scope of the present disclosure as defined by the appended claims.

What is claimed is:

1. A perfluorinated sulfonic acid polymer monolithic membrane, consisting of a surface porous membrane layer and a bottom non-porous dense membrane layer present at the bottom of the surface porous membrane layer, wherein the surface porous membrane layer and the bottom non-porous dense membrane layer constitutes a monolithic membrane casted as a single membrane, and the surface porous membrane layer is made by a solvent evaporation method using a non-solvent.

2. The perfluorinated sulfonic acid polymer membrane according to claim 1, wherein the perfluorinated sulfonic acid polymer membrane is used in fuel cells, sensors, electrolytic cells, gas separators, or humidifiers.

* * * * *